Dec. 25, 1962    N. E. COLESTOCK    3,069,756
METHOD OF FORMING GEAR BLANKS
Filed July 10, 1958    2 Sheets-Sheet 1

INVENTOR.
NEIL E. COLESTOCK
BY Kenneth C. Witt
ATTY.

INVENTOR.
NEIL E. COLESTOCK
BY Kenneth C. Witt
ATTY.

3,069,756
METHOD OF FORMING GEAR BLANKS
Neil E. Colestock, Jackson, Mich., assignor to Clark Equipment Company, a corporation of Michigan
Filed July 10, 1958, Ser. No. 747,729
5 Claims. (Cl. 29—159.2)

This invention relates to methods for forming gear blanks, and more particularly to a method of forming a plurality of gear blanks from a single piece of stock.

This invention is illustrated and described herein as applied to the formation of a bevel ring gear and two bevel side gears as used in an axle differential in an automotive vehicle. It will be readily apparent, however, that the invention is not limited to such use but may be used with equal facility and advantage in the forming of many other gear blanks.

It is conventional to form a single gear from a single piece of stock material. If the stock is large enough initially to form several gears it is ordinarily cut up before or during the forming process into a number of pieces of stock equal to the number of gears to be formed.

Gears are formed by forging, machining and other processes, and by combinations of such processes. When gears are required to carry heavy loads such as in automotive vehicles, particularly in trucks and other heavy duty vehicles, it is common practice to forge the blanks from which gears are cut. Such a process produces gears having greater strength and better wearing qualities.

In forming a gear blank by forging there is frequently considerable waste material remaining after the forging operation which must be removed from the blank before it can be subjected to machining or other subsequent operations. In the forging of a blank for an annular ring gear, for example, there is usually a substantial amount of waste material in the form of a thin web extending across the space within the annular body portion of the blank.

It is the object of the present invention to provide a method of forming gear blanks in which a plurality of such blanks are formed from a single piece of stock material.

Another object of the present invention is the provision of a method of forming gear blanks at lower cost, with fewer operations, and with less waste material than conventional methods.

A more specific object is to provide a method in which a plurality of gear blanks are formed from a single piece of stock and all of the gear blanks have uniform grain structure.

In carrying out my invention in one preferred embodiment thereof I form the gear blanks for one bevel ring gear and two bevel side gears of an automotive axle differential from a single piece of stock material. After the stock material has been heated and the scale on it cracked it is given a preliminary impression by placing it between "preform" dies and striking it a blow with a forging hammer or press. Then the stock material is turned over and placed between the final dies and is struck another blow to form a composite gear blank with two side gear blank portions in the center of the ring gear blank portion. Three separate blanks are then produced by punching out the waste material and sawing the two side gear blank portions apart.

For a clearer and more complete understanding of my invention, reference should be had to the accompanying drawing wherein.

Figure 1:
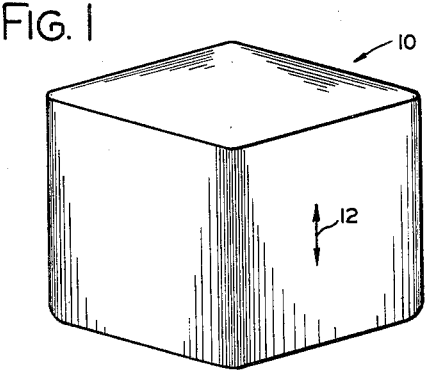
FIGURE 1 is a perspective view of a stock or mass of material from which three gear blanks may be made.

Referring now to FIGURE 1, a piece of stock or mass of material 10, preferably steel, of predetermined amount to provide sufficient material for the formation of a plurality of gear blanks in a single forging operation is selected. As is indicated, the material 10 is preferably generally square or rectangularly shaped as such material ordinarily is more economical than round stock. However, round or any other suitably shaped stock may be employed if so desired. The grain of the mass of material 10 runs in the direction indicated by the arrow 12.

Figure 2:
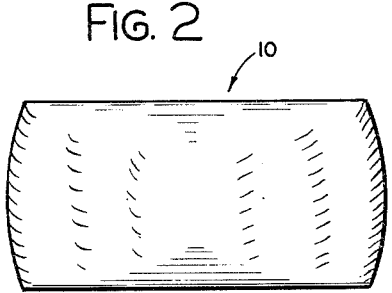
FIGURE 2 is an elevational view of such mass after being struck an initial blow to crack the scale thereon.

The mass of material 10 is heated in any desired manner to a suitable forging temperature, and is then struck an initial blow endwise of the grain, for example at one corner of the die in a forging hammer or press to crack the scale thereon which step is conventional in forging operations. This initial blow flattens the mass slightly to a shape substantially as illustrated in FIGURE 2.

Figure 3:
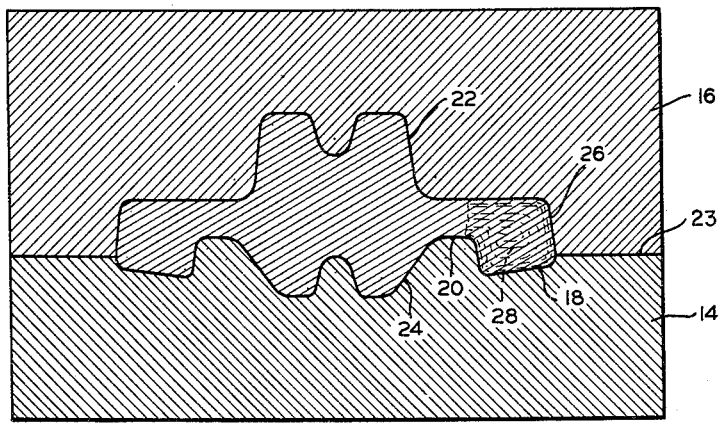
FIGURE 3 is a cross-sectional view which illustrates a roughing impression made by a forging hammer during the forming of blanks for a ring gear and a pair of smaller gears.

Next, the flattened mass of material 10 is turned over and a roughing impression is made by placing it in a "preform" die 14 which cooperates with a counterpart preform die 16 on the vertically movable plunger of a forging machine (not shown) to partially forge the material into the desired form, as shown in FIGURE 3. The preform dies 14 and 16 are preferably placed adjacent one corner of the main dies within the forging machine so that the operator may readily see to position the part properly in the preform die and quickly transfer the part to the main dies after the roughing operation.

As previously mentioned, the present invention is concerned with a method of producing a plurality of gear blanks from a single mass of material. For illustrative purposes in describing the invention, it is assumed that it is desired to produce gear blanks for a bevel ring gear and a pair of bevel side gears in one series of operations. The "preform" or roughing impression of FIGURE 3 partially forms the mass of material into a shape having a large annular ring gear blank portion 18 which is connected by an annular web 20 to an annular double side gear blank portion having hubs 22 and 24 which project vertically upwardly and downwardly, respectively, from the web 20. It is to be noted that pressure is applied to the mass of material in an axial direction, and that the dies 14 and 16 are so related as to provide a forging parting line 23 intermediate the upper and lower surfaces of the ring blank portion 18 and adjacent the lower edge of peripheral face 26 of such portion. This is an important factor in causing the metal grain flow lines 28 for the ring gear portion to extend radially adjacent each side of the gear and parallel to face 26, to provide for maximum strength.

Figure 4:
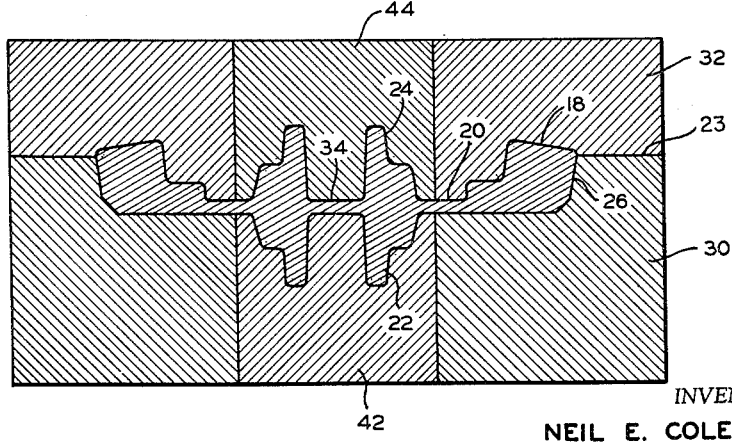
FIGURE 4 is a cross-sectional view illustrating the final hammer forging impression.

After formation of the preform blank illustrated in FIGURE 3, it is next turned over, placed in main stationary die 30, and forged to final impression. Such final forging impression is illustrated in FIGURE 4, from which it can be seen that the contour of the ring gear blank portion 18 and side gear blank portions 24 and 22 are further changed, but stationary die 30 and vertically movable die 32 which is on the plunger portion of the forging hammer, still cooperate to maintain parting line 23 at the desired location intermediate the sides of blank 18 and adjacent one edge of face 26. In the forging dies such as those of FIGURES 3 and 4 it is necessary to form so-called "draft" on the face 26 to enable the dies to be readily separated.

The final forging operation just described, forms a composite blank for a ring gear 18 and a pair of smaller gears 22 and 24. The ring gear blank portion is joined to the compound side gear blank portion by a thin annular web 20. The side gear blanks 22 and 24 are joined at this stage in a unitary structure having a thin web of material 34 extending across what would otherwise be an opening therethrough.

Figure 5:
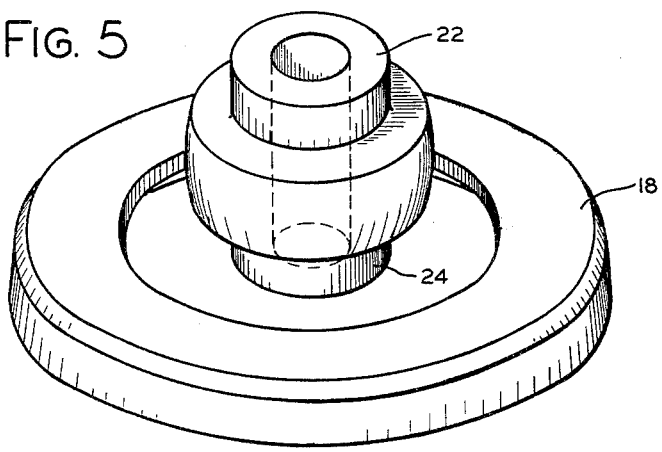
FIGURE 5 is a perspective view of the composite gear blank after waste material has been removed and the ring gear blank separated from the inner double gear blank by a punching operation.

The composite gear blank thus formed in the forging machine is then removed from such forge and the central web 34 and the annular web 20 are removed by placing the composite gear blank in a punching press having a compound trim die provided with a centrally disposed circular punch and an annular punch corresponding to the webs; and the webs are punched out in a manner well known in the art. The ring gear blank 18 is thus separated from the central gear blank portion 22, 24 as illustrated in FIGURE 5.

Figure 6:
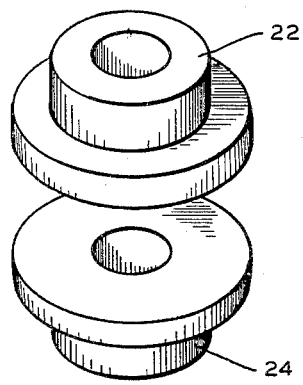
FIGURE 6 is a perspective view illustrating the pair of the smaller gear blanks after they have been separated by a sawing operation.

The compound gear blank 22, 24 is then cut in two parts transversely as illustrated in FIGURE 6 by any suitable means such, for example, as by an air operated hot saw, thereby providing two separate blanks for a pair of bevel gears.

Before finishing, the gear blanks 18, 22 and 24 may be annealed and normalized to relieve them of internal strains. They may be subsequently heat treated, after being machined and provided with the gear teeth, to harden them and develop the desired temper therein.

Figure 7:
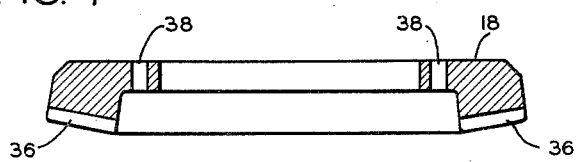
FIGURE 7 is a cross-sectional view through a finished bevel ring gear made from the forged ring gear blank.

The ring gear blanks then are provided with the desired number of gear teeth 36 on the bevel surface thereof by a known machining process, and suitable apertures 38 may be drilled therein to be utilized in mounting the finished gear wheel upon a suitable carrier or other support. A finished ring gear is illustrated in cross-section in FIGURE 7.

Figure 8:
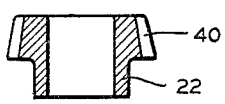
FIGURE 8 is a cross-sectional view through a finished bevel side gear made from one of the two smaller gear blanks.

In a like manner, the individual side gear blanks 22 and 24 may then be put through the usual operation to provide a desired number of teeth 40 thereon and the central apertures may be suitably bored out for mounting upon shafts in any desired manner. A bevel side gear so finished is illustrated in cross-section in FIGURE 8.

It may be desirable to manufacture composite blanks for various types and sizes of gears, or in some instances it may be desired to produce a ring gear blank only or the double side gear blank only. Referring again to FIGURE 4, it will be seen that the die 30 may be provided with a removable insert 42 and the reciprocable die 32 may likewise be provided with a removable insert 44. If it is desired to produce small gears of a somewhat different size or contour, the inserts 42 and 44 may be removed and replaced by other inserts having the desired contour. If it is desired to produce the ring gear only, the inserts 42 and 44 may be removed and replaced by suitable blank die portions. Also, if it is desired to produce the double side gear blank only, the inserts 42 and 44 may be used for this purpose apart from the outer portions of the dies 30 and 32 which form the contour for the ring gear blank.

From the preceding description, it is apparent that the present invention provides a method of producing a plurality of gear blanks from a single piece of stock in one series of operations to thereby accomplish the stated objects.

The simultaneous forging of a plurality of gear blanks including an annular gear blank by the method of the present invention substantially reduces the amount of waste material which would otherwise be formed in the production of an annular gear blank by itself.

It should be noted that since the vertically movable forging hammer provides pressure in an axial direction on the entire mass of material, the flow lines of the metal in the two smaller gear blanks are also uniform and extend radially adjacent each side of the gear blanks as shown in connection with the ring gear blank in the foregoing description. All of the gear blanks thus formed have the grain flow lines extending in the proper pattern to provide the finished gears with desirable strength and wearing qualities.

It should also be noted that while the initial cost of the forming dies used in producing gear blanks in accordance with the present invention is higher than the cost of either ring gear blank forming dies or side gear blank forming dies individually, the total die cost for this method is substantially less than the sum of the cost of the separate sets of dies. Also, since a plurality of gear blanks may be formed by the method of the present invention in one series of operations almost as rapidly as either of the individual blanks could be formed in separate forging operations, a substantial saving in labor costs may be effected by producing gear blanks by the method herein disclosed.

Although the method of the present invention has been described in a preferred form adaptable to the production of a plurality of gear blanks for a bevel ring gear and a pair of smaller bevel gears, it is not intended that it be limited to this particular embodiment nor otherwise than by the terms of the appended claims.

I claim:

1. The method of forming a plurality of gear blanks including an annular gear blank and two other gear blanks from a single piece of stock material having the grain structure pattern flow lines extending initially in a predetermined direction comprising the steps of, heating the piece of stock material, preforming the said piece of material by hammering it in the said direction in a preform die, finish forming the said piece of material by pressure exerted in the said direction into a compound gear blank including an annular gear blank and a central compound gear blank portion integrally joined together by a thin web of material, separating the annular gear blank from the said central compound gear blank portion by removing the web of material, and severing the said central compound gear blank portion transversely of the axis thereof to form two separate gear blanks.

2. The method of forming a plurality of gear blanks from a single mass of material having the grain structure pattern flow lines extending initially in a predetermined direction comprising the steps of, heating the mass of material, hammering the mass in the said predetermined direction into a die to form a composite gear blank including an outer annular gear blank and an inner annular double gear blank portion joined together by a thin web of material, separating the said outer gear blank from the said inner gear blank portion by removing the web of material, and severing the inner annular double gear blank portion transversely of its axis to form two separate gear blanks.

3. The method of making from a single piece of metal stock material having a grain structure extending in a predetermined direction, three gear blanks including a relatively large annular gear blank adapted for the manufacture of a ring gear and a pair of smaller annular gear blanks adapted for the manufacture of gears with teeth around the outer periphery, the method comprising heating the said material to forging temperature, striking the said piece of material a blow endwise of the grain to crack the scale thereon, producing an initial impression on the said material by forging it endwise of the grain between a pair of contoured preform dies, removing the material from the preform dies and turning it over and forging it between a pair of contoured final dies, whereby to produce a composite gear blank member having an outer annular gear blank portion and an inner annular double gear blank portion including a thin web of waste material connecting the said outer annular gear blank portion to the said inner annular double gear blank portion, removing the said thin web portion by a punching operation thereby separating the said outer annular gear blank portion from the said inner annular double gear blank portion, and thereafter severing the said inner annular double gear blank portion transversely of its axis to form two separate gear blanks.

4. The method of making from a single piece of metal stock material having a grain structure extending in a predetermined direction three separate gear blanks including a relatively large annular gear blank adapted for the manufacture of a ring gear with teeth projecting axially and a pair of smaller annular gear blanks adapted for the manufacture of gears with teeth around the outer periphery, the method comprising heating the said material to forging temperature, striking the said piece of material a blow endwise of the grain to crack the scale thereon, producing an initial impression on the said material by forging it endwise of the grain between a pair of contoured preform dies in which the parting line is adjacent the portion of the material from which the said axially extending teeth are to be formed, removing the material from the preform dies and turning it over and forging it between a pair of contoured final dies in which the parting line likewise is adjacent the portion of the material from which the said axially extending teeth will be formed, whereby to produce a composite gear blank member having an outer annular gear blank portion and an inner annular double gear blank portion including a thin web of waste material connecting the said outer annular gear blank portion to the said inner annular double gear blank portion and an additional thin web of waste material internally of the said annular double gear blank portion, removing the said thin web portions simultaneously by a punching operation thereby separating the said outer gear blank portion from the said inner annular double gear blank portion, and thereafter severing the said inner annular double gear blank portion transversely of its axis to form two separate gear blanks.

5. The method of making from a single piece of metal stock material having a grain structure extending in a predetermined direction three separate gear blanks including a relatively large outer annular gear blank adapted for the manufacture of a ring gear with teeth projecting axially and a pair of smaller inner annular gear blanks adapted for the manufacture of gears with teeth around the outer periphery, the method comprising heating the said material to forging temperature, striking the said piece of material a blow in the said direction to crack the scale thereon, producing an initial impression on the said material by forging it in the same said direction between a pair of contoured preform dies in which the parting line is adjacent the portion of the material from which the said axially extending teeth are to be formed, removing the material from the preform dies and turning it over and forging it in the same said direction between a pair of contoured final dies in which the parting line likewise is adjacent the portion of the material from which the said axially extending teeth will be formed, whereby to produce a composite gear blank member having an outer annular gear blank portion with grain flow lines which follow the contour of the surface on which the axially projecting teeth are to be cut and are parallel to the individual teeth and an inner annular double gear blank portion with grain flow lines which follow the contour of the surfaces on which the peripheral teeth are to be cut and are parallel to the individual teeth and including a thin web of waste material connecting the outer annular gear blank portion to the inner annular double gear blank portion and an additional thin web of waste material internally of the said annular double gear blank portion, removing the said thin web portions simultaneously by a punching operation thereby separating the said outer gear blank portion from the said inner annular double gear blank portion, and thereafter severing the said inner annular double gear blank portion transversely of its axis to form two separate gear blanks.

References Cited in the file of this patent

UNITED STATES PATENTS

| | | |
|---|---|---|
| 438,253 | Lorenz | Oct. 14, 1890 |
| 717,886 | Mercader et al. | Jan. 6, 1903 |
| 1,454,508 | Eckert | May 8, 1923 |
| 1,606,282 | Witter | Nov. 9, 1926 |
| 1,632,533 | Brauchler | June 14, 1927 |
| 2,116,804 | Swanson | May 10, 1938 |
| 2,203,125 | Beauchamp | June 4, 1940 |

FOREIGN PATENTS

| | | |
|---|---|---|
| 347,260 | Germany | Jan. 19, 1922 |
| 330,840 | Great Britain | June 19, 1930 |

OTHER REFERENCES

Metals Handbook, page 41, 1948 edition; The American Society for Metals, 7301 Euclid Avenue, Cleveland 3, Ohio.